United States Patent [19]

Argumedo et al.

[11] Patent Number: 5,543,993
[45] Date of Patent: Aug. 6, 1996

[54] DOOR OPENING MECHANISM FOR MAGNETIC TAPE CARTRIDGE WITH TENSION CONTROL

[75] Inventors: Armando J. Argumedo; Kenneth R. Shelley, both of Tucson, Ariz.

[73] Assignee: International Business Machines Corporation, Armonk, N.Y.

[21] Appl. No.: 454,897

[22] Filed: May 31, 1995

Related U.S. Application Data

[63] Continuation of Ser. No. 229,968, Apr. 19, 1994, abandoned.
[51] Int. Cl.[6] ............................ G11B 15/60; G11B 23/02
[52] U.S. Cl. ............................ 360/132; 360/96.5; 360/93
[58] Field of Search .................... 360/96.5, 132, 360/93, 95, 96.6, 96.1; 242/326, 326.1, 335, 338, 338.2, 338.4, 347, 347.1, 347.2

[56] References Cited

U.S. PATENT DOCUMENTS

| | | | |
|---|---|---|---|
| 3,962,727 | 6/1976 | Kamimura et al. | 360/85 |
| 4,677,508 | 6/1987 | Barton, Jr. et al. | 360/96.5 |
| 5,025,334 | 6/1991 | Perona et al. | 360/96.5 |
| 5,109,308 | 4/1992 | Kukreja et al. | 360/96.5 |
| 5,204,792 | 4/1993 | Bryer | 360/96.5 |
| 5,289,324 | 2/1994 | Katoka et al. | 360/132 |
| 5,294,072 | 3/1994 | East et al. | 360/132 |

*Primary Examiner*—Stuart S. Levy
*Assistant Examiner*—David L. Ometz
*Attorney, Agent, or Firm*—Baker, Maxham, Jester & Meador

[57] ABSTRACT

A mechanism for opening a tape access door at the forward end of a tape cartridge which pivots about an axis perpendicular to a mount plate of the cartridge. The access door is spring biased to a closed position and includes a slot which opens along a side wall of the door and has a rearward end that angles open on an outer wall of the door. The door opening mechanism itself comprises an elongate door opener frame, a pin extending from a forward end of the door opener frame, a door opener bearing and a pivot shaft for pivotally mounting a rearward end of the door opener frame and a rear end of the opener bearing to a frame of a loader mechanism adjacent a cartridge insertion slot thereof.

13 Claims, 8 Drawing Sheets

DOOR OPENING MECHANISM FOR MAGNETIC TAPE CARTRIDGE WITH TENSION CONTROL

This application is a continuation of application Ser. No. 08/229,968, filed Apr. 19, 1994, now abandoned.

BACKGROUND OF THE INVENTION

1. Field of the Invention

The present invention relates to the storage and retrieval of data on magnetic tape, and more particularly, to a mechanism for opening the tape access door of a tape cartridge to expose a segment of magnetic tape inside the cartridge for engagement by a transducer head.

2. Description of the Related Art

Magnetic tape has long been used as a storage media for audio, video and computer information. Tape cartridges have been used extensively because they provide a convenient way to house and support a length of magnetic tape for engagement by a transducer in a tape drive while protecting the tape upon removal of the cartridge. Tape cartridges with dual reels are widely used because they eliminate the need to thread a leader outside the cartridge or utilize an endless loop single reel arrangement. Examples of dual reel tape cartridges that have been extensively commercialized are the Phillips cassette used for audio recording, the VHS cassette used for video recording, and the DC600 data cartridge used for back-up storage of computer data files stored on hard disk drives. The latter data cartridge is disclosed in U.S. Pat. No. 3,692,255 of Von Behren assigned to Minnesota Mining and Manufacturing Corporation.

Many prior art magnetic tape cartridges have included a moveable door for opening and closing a tape access opening. Conventionally, the door is opened when the tape cartridge is inserted into a tape drive in order to expose a segment of magnetic tape which is engaged by a transducer head. Typically a tape access door either pivots or slides open and closed. When the tape cartridge is removed from the tape drive, the tape access door is usually closed by a bias spring. This protects the magnetic tape within the tape cartridge from contact with a user's hand. The closed tape access door also prevents dust and other debris from entering the tape cartridge. Such dust and debris can contaminate the tape and result in subsequent errors in reading and/or writing data onto the tape.

The design of a door opening mechanism for a tape drive is critical to its reliable operation. Clearly if the tape access door mechanism fails to properly open the door, data cannot be read from the tape or recorded onto the same. A worse consequence is that the tape cartridge, with its tape access door fully closed, may be jammed or forced into contact with the delicate face of the transducer head. The transducer head is typically one of the most expensive items in a tape drive. It often has a delicate structure including laminate assemblies or thin film elements which may be either inductive or magnetoresistive. These elements can be easily damaged.

In most cases, when a tape cartridge is inserted into a tape drive the initial part of the insertion process is done manually. The cartridge is often inserted into a carriage which is thereafter automatically driven by a motor to translate the cartridge to a head. In such a drive, it is critical that the tape access door opening mechanism not only operate reliably, but that it open the tape access door in the proper time sequence so that the door will clear various other structures within the tape drive yet end up sufficiently open to permit proper head engagement. To further complicate matters, it is frequently necessary for tape drives, particularly those that serve as peripheral storage devices for computers, to fit within very constrained industry standard mechanical form factors. In such cases, the space available for the door opening mechanism is extremely limited. This often limits the range of motion of the tape access door.

Another very important consideration in designing a tape access door opener for a tape cartridge is that the cartridge must be registered in a very precise manner in order to enable high density, multi-track reading and writing. This usually requires that a data cartridge have a rigid metal base or mount plate which can be clamped against fixed datums. It is usually necessary to move the mount plate perpendicular to its plane during the registration process along a Z axis. Thus, the tape access door must be capable of accommodating such transverse movement of data cartridge away from its cartridge insertion axis. Also, it may be necessary to move the data cartridge in both the X and Y axes of the mount plate during the loading process. Therefore, a door opener should be capable of accommodating movement in the X, Y and Z planes.

Finally, a tape access door mechanism must be compliant to variations in the cartridge loader mechanism and cartridge. This is necessary to ensure that the door ends up fully open.

Thus, there is a strong need to provide a reliable and compact tape access door opening mechanism for a given tape cartridge design. Preferably such a tape access door opening mechanism should not include motors, solenoids or other electro-mechanical activating mechanisms. Such mechanisms not only consume additional space, but they add to the cost of the tape drive and represent potential failure points. As already explained, the failure of the tape access door opening mechanism can be catastrophic, both because it prevents the tape drive from operating, and because such a failure can result in the destruction of the transducer head.

VHS, BETA and 8 mm video tape cartridges all incorporate a tape access door which rotates about an axis parallel to the plane of the base surface thereof through which the reel hubs are accessed. Many tape drives which utilize these video tape cartridges include motor driven auto loading mechanisms. Typically the video cartridge is manually inserted into a carriage which then reciprocates downwardly to register the hubs over drive spindles. Upon insertion of the video tape cartridge, there is normally a tab on the video cartridge which is depressed by a projection on the carriage to unlock the tape access door. The tape access door is then lifted open by a simple finger or flange on the drive frame adjacent the carriage as the tape cartridge is translated to engage the drive spindles.

The tape access door of the data cartridge disclosed in the aforementioned U.S. Pat. No. 3,692,255 pivots open about an axis substantially perpendicular to the rigid Aluminum mount plate of the cartridge (Z axis movement). The tape access door of this cartridge is positioned along one of the major side edges of the tape cartridge. Many door opening mechanisms have been utilized in conjunction with this data cartridge which has been widely commercialized under the model numbers DC300 and DC600. One of the earliest examples of a door opening mechanism for the DC300/DC600 data cartridge is disclosed in U.S. Pat. No. 4,573,091 of Barton, Jr., et al. The data cartridge is inserted on a tray. A spring biased door opening linkage connected between the tray and the frame of the tape drive pushes on the end of the tape access door. This partially opens the door in the proper time sequence to clear the transducer head without exceeding the five and one-quarter inch form factor.

A later example of a door opening mechanism for opening the tape access door of the DC300/DC600 data cartridge is shown in U.S. Pat. No. 5,025,334 of Perona, et al. In the tape drive disclosed in that patent, the tape is manually loaded onto a tray which is then automatically moved forwardly and then transversely. The end of the tape access door is engaged by a door opener comprising an L-shaped member with orthogonal arms. The member is pivotally mounted to a vertical pin secured to the front right corner of the tray. A torsion spring surrounds the pin and biases the member in a clockwise direction.

An improved magnetic tape cartridge particularly well suited for high capacity computer data storage is disclosed in U.S. Pat. No. 5,294,072 of Don G. East, et al. assigned to International Business Machines Corporation. FIG. 1 is a perspective view of the prior art magnetic tape cartridge A with improved tension control which is described in detail in the aforementioned U.S. Pat. No. 5,294,072, the entire disclosure of which is specifically incorporated herein by reference.

The tape cartridge A (FIG. 1) includes a generally rectangular housing formed by a rigid Aluminum mount plate B and a box-like molded plastic cover C. The cover C includes a pair of holes exposing two toothed tape reel hubs (not visible). A length of magnetic tape (not shown) is wound between the tape reels (not shown) inside the plastic cover C.

A forward end of the tape cartridge A (FIG. 1) is provided with a tape access door D which pivots about an axis substantially perpendicular to the plane of the mount plate B. The tape access door D is shown pivoted to its fully open position in FIG. 1, thereby exposing a segment of the magnetic tape (not shown) through a head access opening formed in the forward end of the plastic cover C. The door D is biased to its closed position by a torsion spring (not shown) associated with the pivot pin of the door D. A slot E is formed on one side wall of the door D for engagement by a pin of a door opener. The slot E is straight except for a rearward end thereof which angles open on an the outer wall of the door D. The slot E also opens on the side of the door D along the entire length of the slot.

The magnetic tape rides around and between a pair of tape guides F and G (FIG. 1) secured to the mount plate B. The inside of the tape access door D (FIG. 1) is provided with a pseudo-head H. When the tape access door D is in its closed position, the pseudo-head H occupies the space otherwise occupied by the tape transducer or head of a tape drive when the head is mated with the exposed segment of magnetic tape. When the pseudo-head H engages the tape it prevents the tape from being drawn taught between the guides F and G. When the drive clutches of the tape drive are disengaged from the reel hubs, the rotational position of the tape reels is locked. These two improvements maintain proper tape tension when the cartridge is removed from the tape drive.

SUMMARY OF THE INVENTION

It is therefore the primary object of the present invention to provide a door opening mechanism for a tape cartridge of the general type disclosed in U.S. Pat. No. 5,294,072 of Don E. East, et al.

Accordingly, the present invention provides a mechanism for opening a tape access door at the forward end of a tape cartridge which pivots about an axis perpendicular to a mount plate of the cartridge. The access door is spring biased to a closed position and includes a slot which opens along a side wall of the door and has a rearward end that angles open on an outer wall of the door. The door opening mechanism itself comprises an elongate door opener frame, a pin extending from a forward end of the door opener frame, and a pivot assembly for pivotally mounting a rearward end of the door opener frame to a frame of a loader mechanism adjacent a cartridge insertion slot thereof. The door opener frame rotates about a door opener pivot axis perpendicular to the mount plate of the cartridge so that the pin will slide into the slot in the door of the cartridge and pivot the door open as the cartridge is inserted into the cartridge insertion slot.

BRIEF DESCRIPTION OF THE DRAWINGS

Throughout the drawing figures, like reference numerals refer to like parts, unless otherwise indicated. Within each figure, the parts illustrated have been drawn in the proper scale relative to each other.

DETAILED DESCRIPTION OF THE PREFERRED EMBODIMENT

Figure 1:
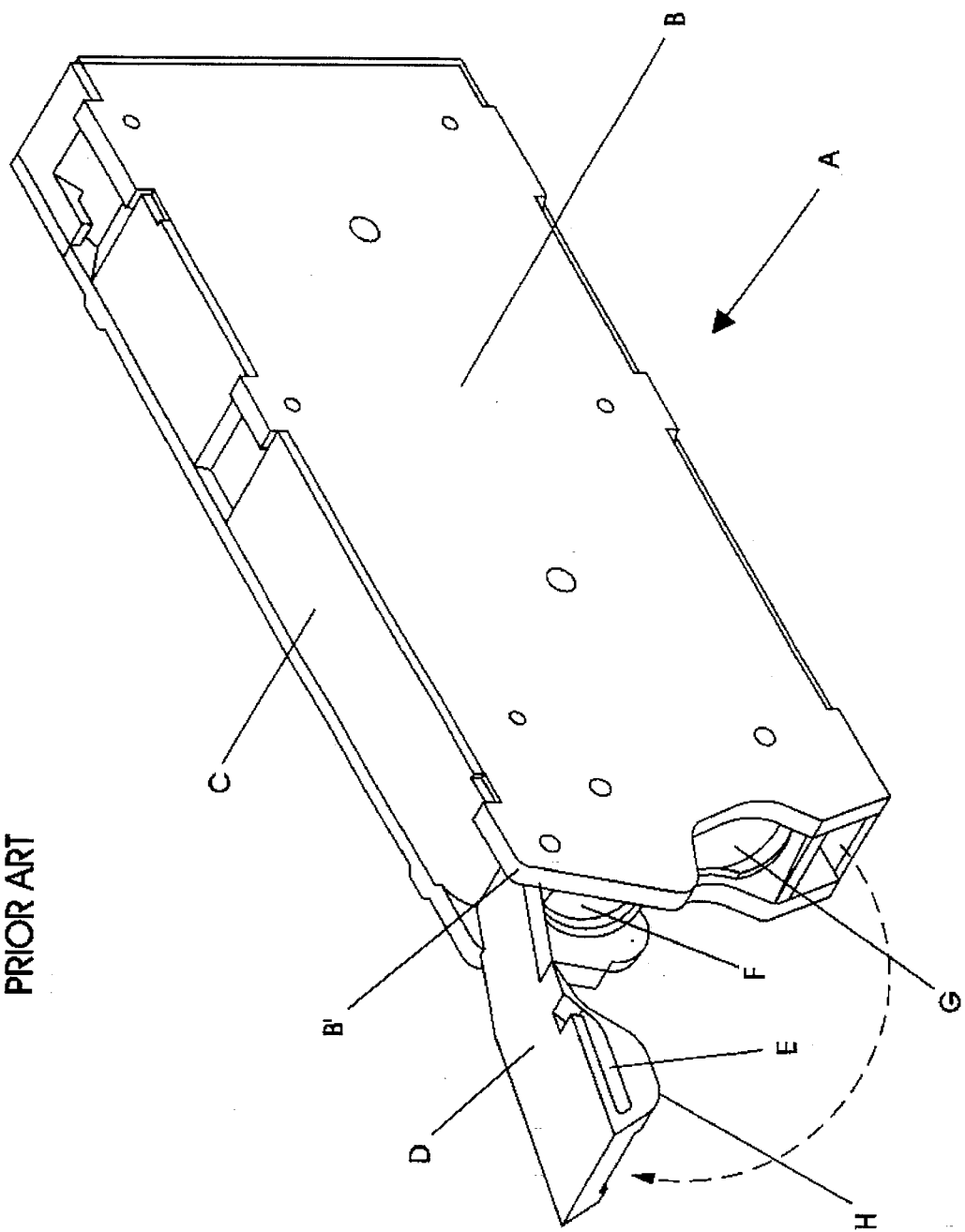
FIG. 1 is a perspective view of the prior art magnetic tape cartridge with which the door opening mechanism of the present invention is designed to operate. The magnetic tape normally exposed by opening the tape access door is not shown in this figure.

The preferred embodiment of the door opening mechanism of the present invention was designed as part of an automatic loader mechanism for the prior art tape cartridge of FIG. 1. Details of this automatic loader mechanism are disclosed in co-pending U.S. patent application Ser. No. 08/229,900 filed on Apr. 19, 1994 of Steven G. Hiscox, et al. entitled "Automatic Loader Mechanism for Magnetic Tape Cartridge with Tension Control". Said application is also assigned to International Business Machines Corporation. The entire disclosure of the aforementioned U.S. patent application of Steven G. Hiscox, et al. is specifically incorporated herein by reference.

Figure 2:
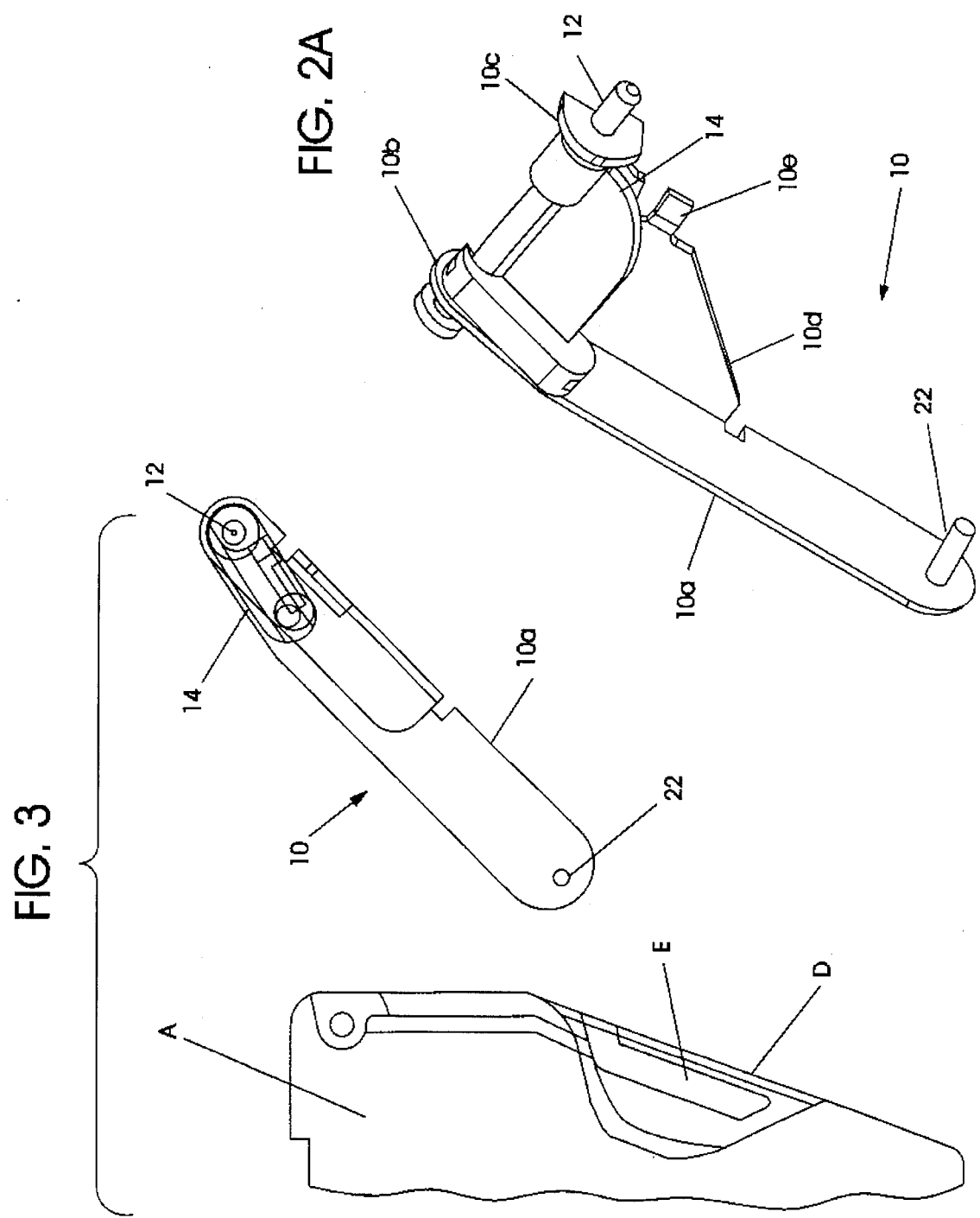
FIG. 2A is an enlarged perspective view of a preferred embodiment of the door opening mechanism of the present invention.
FIG. 2B is an exploded perspective view of a carriage assembly of an automatic loader mechanism incorporating the tape access door opening mechanism of FIG. 2A.

Referring to FIG. 2A, the preferred embodiment of our tape access door opening mechanism comprises an elongate door opener frame 10 whose rearward end is journaled about a pivot shaft 12. The door opening mechanism further comprises an opener bearing 14 whose rearward end is also journaled around the pivot shaft 12. The pivot shaft 12 defines a door opener pivot axis perpendicular to the mount plate B of the cartridge A.

Referring to FIG. 2B, the door opener frame 10 has its rear end pivotally mounted to a carriage frame 16 of an automatic tape cartridge loader mechanism by the pivot shaft 12. The door opener frame 10 has an elongated arm portion 10a (FIG. 2A) and a pair of rearward planar trunion portions 10b and 10c. The trunion portions 10b and 10c are joined by a planar body portion 10d. The door opener frame 10 is preferably formed of sheet metal. The plane of the arm portion 10a is perpendicular to the plane of the body portion 10d. The rear end of the arm portion 10a and the trunion portion 10b are joined with one another and are co-planar.

The pivot shaft 12 (FIG. 2A) extends through a pair of aligned holes in the trunion portion 10b and 10c. These trunion portions 10b and 10c overlap the inside surfaces of the opposite vertical sidewall portions of the carriage frame 16 (FIG. 2B). These portions of the carriage frame have aligned holes for receiving the pivot shaft 12 which also extends through the aligned holes in the trunion portions 10b and 10c of the door opener frame 10.

The cartridge insertion axis Y is shown diagrammatically in FIG. 2B. The cartridge A is loaded forwardly into the carriage frame 16 to the left in FIG. 2B and is withdrawn rearwardly to the right. During the loading process, the cartridge is clamped down along the X axis and is also clamped sideways along the Z axis. The pivot shaft 12 defines a door opener pivot axis perpendicular to the cartridge insertion axis Y and perpendicular to the mount plate B of the cartridge A. This door opener pivot axis is thus parallel to the Z axis in FIG. 2B. The cartridge A is inserted in a vertical orientation, with its door end going in first. The cartridge A is further oriented so that its mount plate B is on the outside, facing the viewer in FIG. 2B. This puts the slot E on the same side of the carriage frame 16 as the door opener pin 22.

Figure 8:
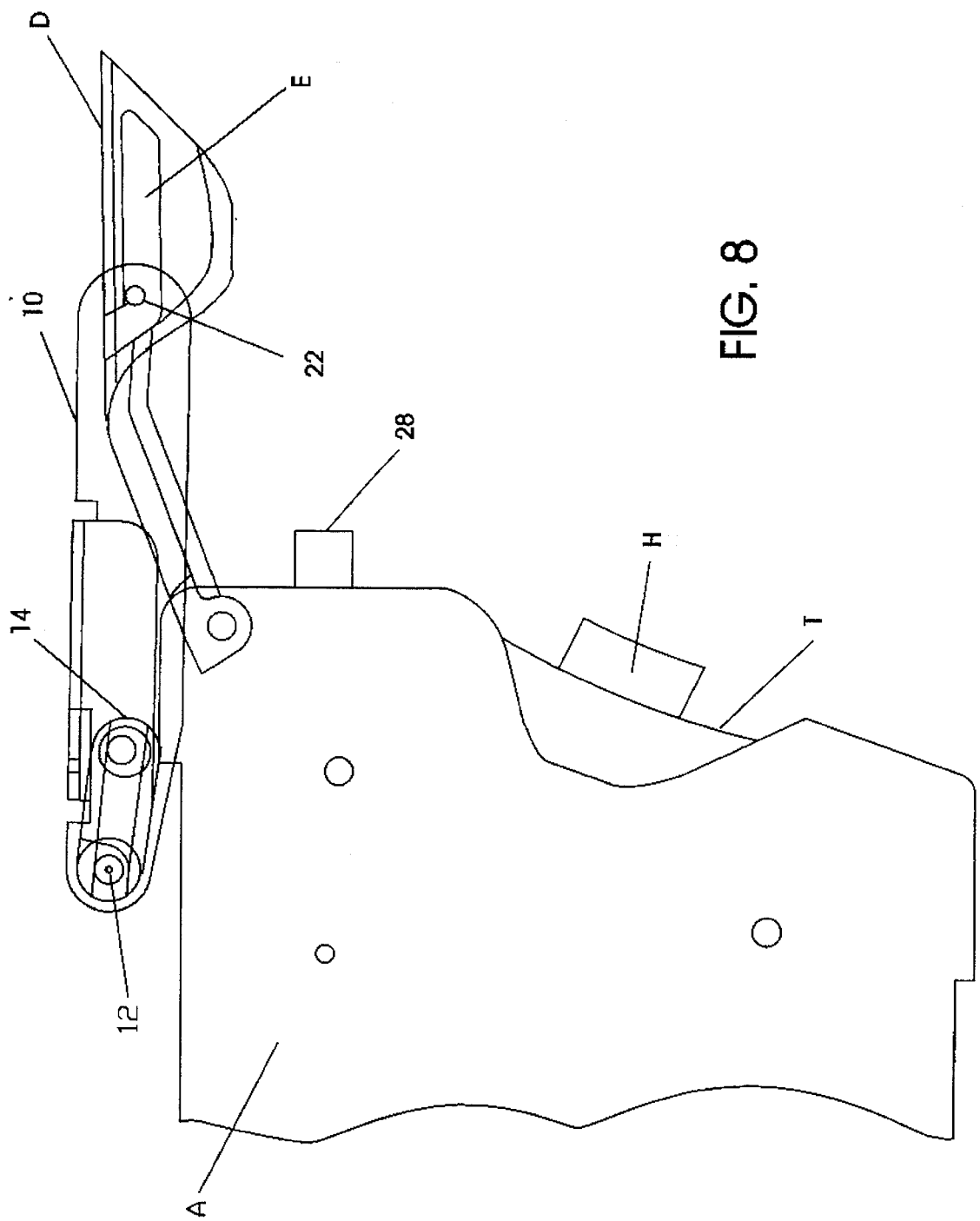

The inner vertical sidewall of the carriage frame 16 (FIG. 2B) is formed with a horizontal tab 16a which engages a flange 10e extending from the body portion 10d of the door opener frame 10 to limit its vertical pivoting motion to a substantially horizontal extended position shown in FIG. 8. The door frame 10 may pivot downwardly in a counter-clockwise direction viewed from the left side of FIG. 2B through approximately one hundred and twenty to one hundred and forty degrees to a retracted position illustrated in FIG. 3. A washer 18 (FIG. 2B) separates the outer vertical sidewall of the carriage frame 16 and the outer trunion portion 10b. The end of the pivot shaft 12 opposite its head has an E-clip 20 which fits over a groove in the shaft 12 to prevent it from withdrawing itself from the carriage frame 16.

The forward end of the arm portion 10a of the door frame has a horizontally extending pin 22 (FIG. 2A) which is slidably received inside the slot E (FIG. 1) of the tape access door D. This enables the door opener frame 10 to open the tape access door D as the cartridge A is slid forwardly through the carriage frame 16. The pin 22 extends inwardly from the frame 10, parallel to the axis of the pivot shaft 12.

The opener bearing 14 is preferably molded of plastic and is shown in slightly a different configuration in FIGS. 2A and 2B. The opener bearing 14 includes rear cylindrical trunion portions 14a and 14b (FIG. 2B) with aligned holes extending therethrough. The opener bearing 14 further includes a main body portion 14c and an arm portion 14d with an outwardly extending post 14e. The trunion portions 14a and 14b of the opener bearing 14 are also journaled around the pivot shaft 12. The opener bearing 14 fits between the trunion portions 10b and 10c of the door opener frame 10.

The post 14e of the opener bearing 14 pushes against the body portion 10d of the door opener frame. The arm portion 14d of the opener bearing also pushes against the edge of the rigid Aluminum mount plate B of the tape cartridge A to provide a fulcrum that facilitates the opening the tape access door D.

A first torsion spring 24 (FIG. 2B) is journaled about the pivot shaft 12 between the trunion portions 14a and 14b of the opener bearing. The torsion spring 24 biases the door opener frame 10 and the opener bearing 14 counter-clockwise in FIG. 2B viewed from the outside of the carriage frame 16.

A second torsion spring 26 (FIG. 2B) is also journaled about the pivot shaft 12 between the outside trunion portion 14b of the opener bearing 14 and the inside vertical flange of the carriage assembly 16. The second torsion spring 26 is compressed between the opener bearing 14 and the door opener frame 10. This arrangement of the torsion springs 24 and 26 facilitates the opening of the tape access door D of the tape cartridge A as it is slid forwardly (to the left) through the cartridge insertion slot defined between the vertical sidewalls of the carriage frame 16. Upon withdrawal of the tape cartridge rearwardly from the carriage frame 16, the door opening mechanism illustrated in FIGS. 2A and 2B ensures that the tape access door D is closed.

Figure 3:
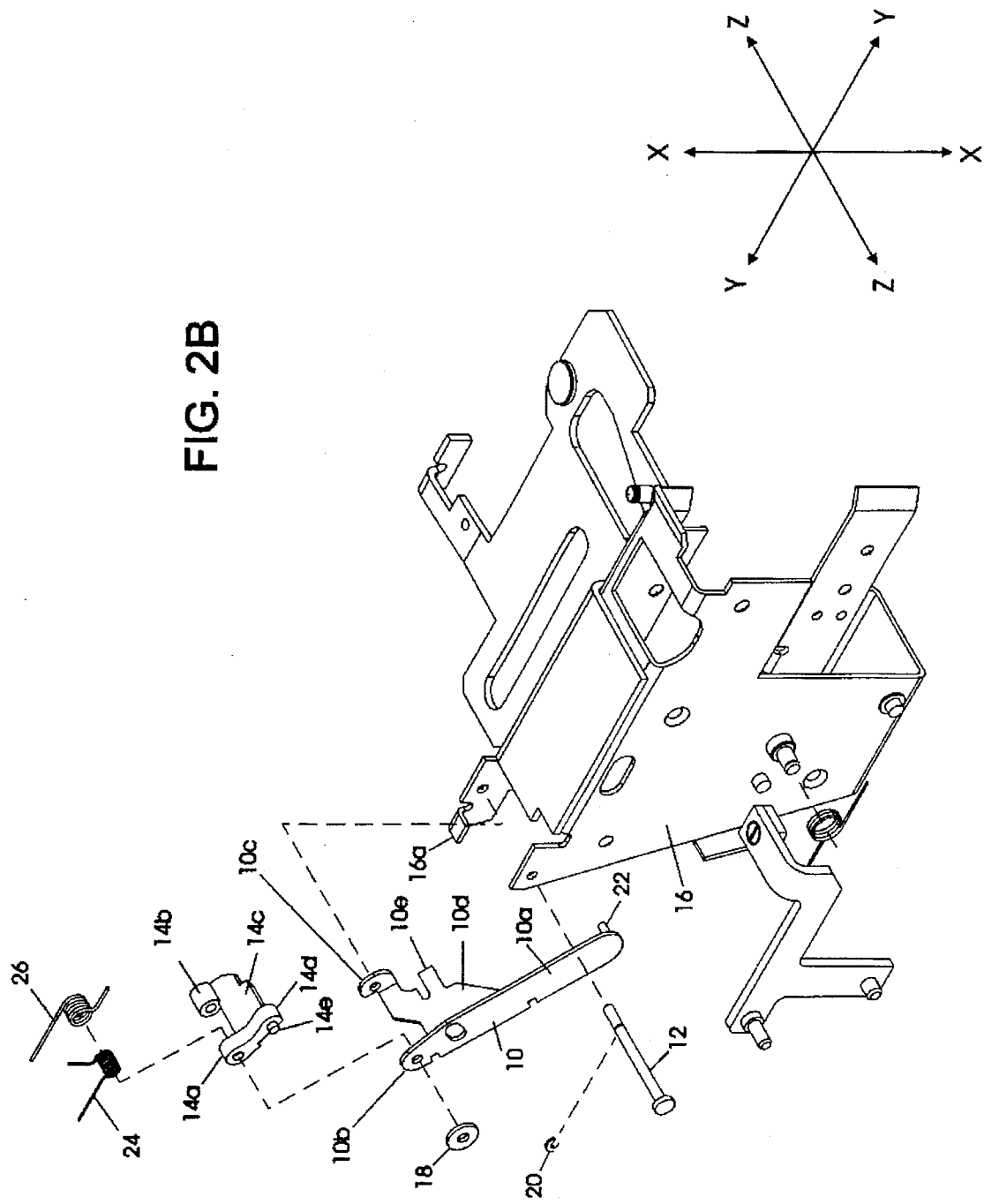
FIGS. 3–8 are a series of enlarged side elevation views illustrating the manner in which the preferred embodiment of the door opening mechanism of FIG. 2A opens the tape access door of the prior art tape cartridge of FIG. 1.

The operation of the preferred embodiment of our tape access door opening mechanism may now be described in conjunction with the sequential side elevation views of FIGS. 3–8. In FIG. 3 the forward end of the cartridge A with its tape access door D fully closed is being forwardly inserted along the cartridge insertion axis Y. The cartridge is either manually inserted, or is inserted by an automated picker used in a tape library system. The door opener frame 10 and the opener bearing 14 are both in their retracted positions in which they are rearwardly and downwardly inclined.

Figure 4:
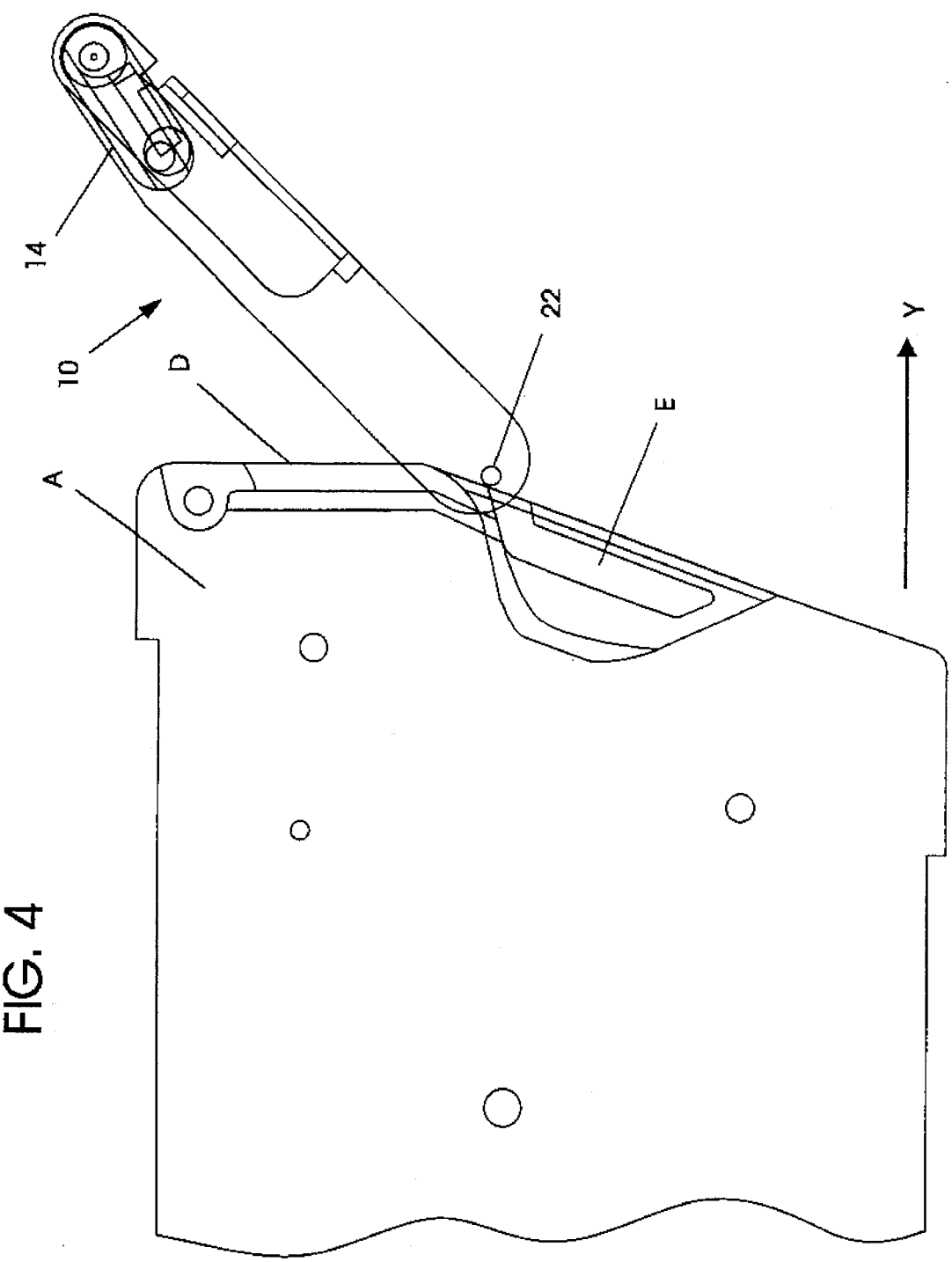

In FIG. 4, the cartridge A has been moved forwardly until the pin 22 of our door opening mechanism engages the outer wall of the door D which is still fully closed. The pin 22 engages the door D slightly above the angled opening of the slot E in the closed tape access door D of the cartridge A. Since the outer wall of the tape access door D is downwardly and rearwardly inclined, continued forward pushing of the tape cartridge A along the cartridge insertion axis Y (to the right in FIG. 4) causes the frame 10 of the door opening mechanism to pivot slightly counter-clockwise in FIG. 4. The pin 22 drops into the rearward, angled opening of the slot E.

Figure 5:
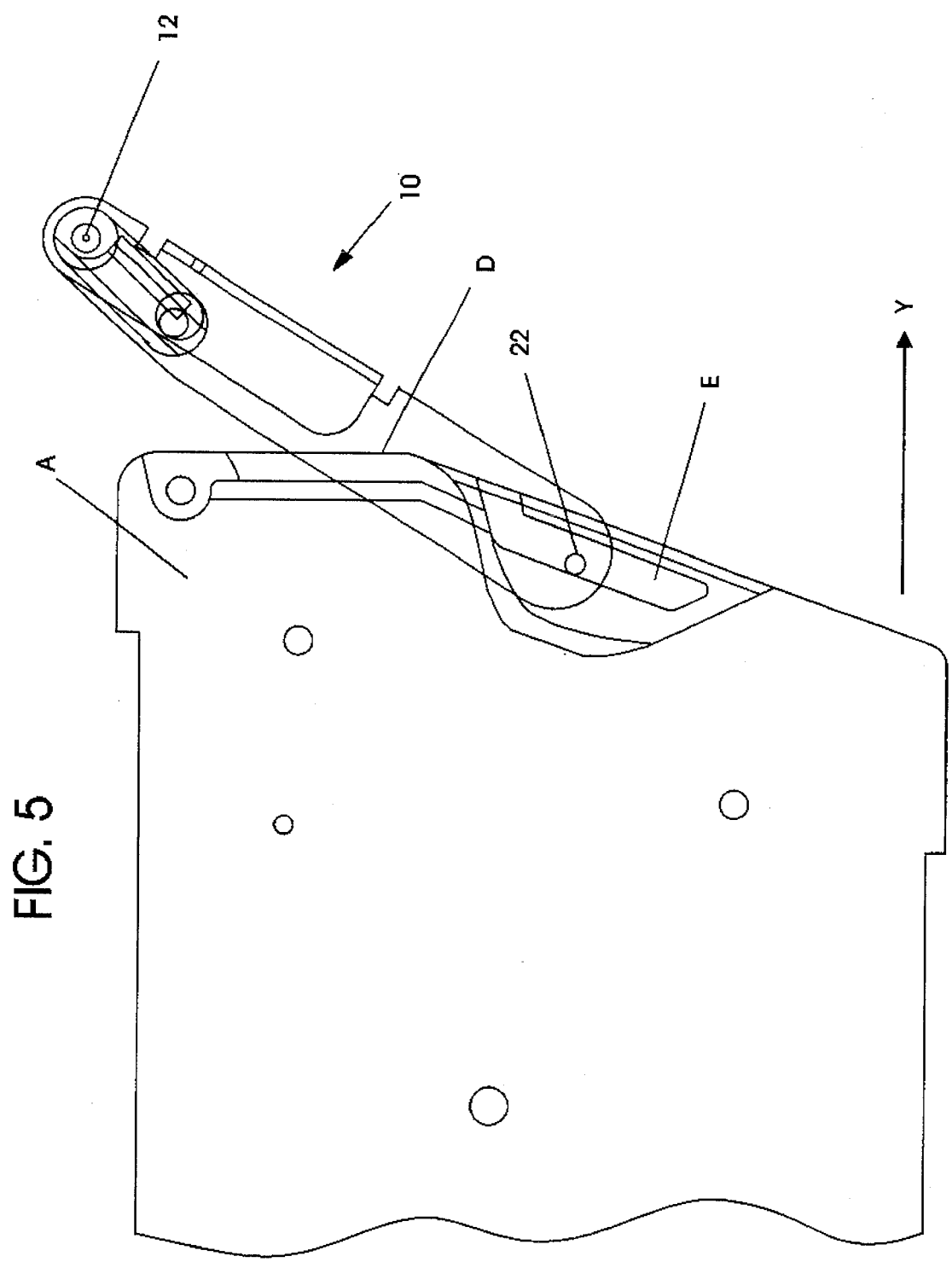

Referring to FIG. 5, as the cartridge A is further pushed forwardly into the cartridge insertion slot, the pin 22 of the door opening mechanism begins to slide downwardly through the straight portion of the slot E in the tape access door D. The tape access door D is still fully closed at this time. The door opener frame 10 rotates about the pivot shaft 12. Recall that the pivot shaft 12 is journeled in holes in the opposite vertical sidewalls of the carriage frame 12 which defines the cartridge insertion slot. The tape cartridge A is moving relative to the carriage frame 16, and thus relative to the pivot shaft 12. The cartridge A slides in a forward direction along the cartridge insertion axis Y in the direction indicated by the arrow in FIG. 5.

Figure 6:
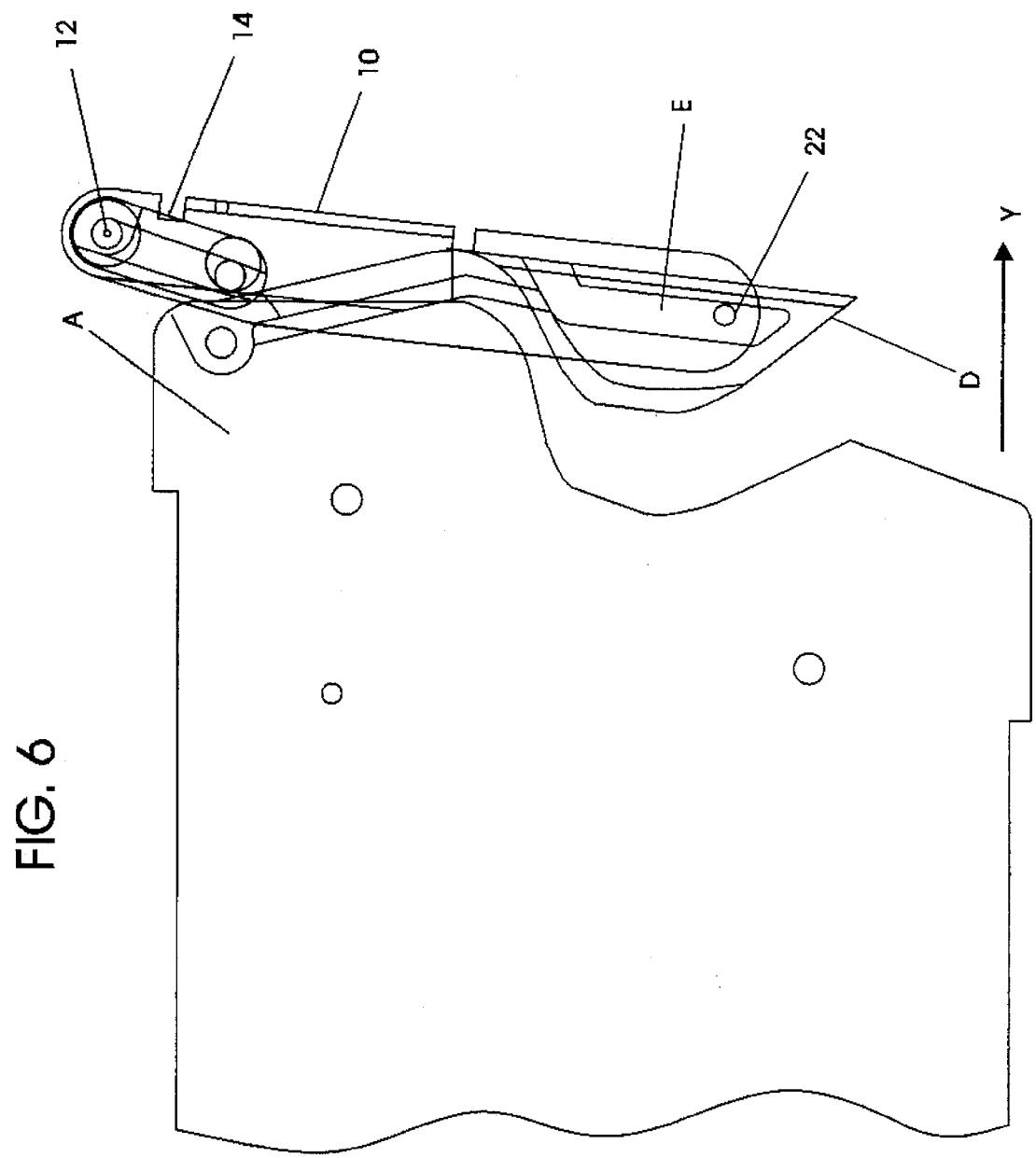

When the tape cartridge A reaches the position illustrated in FIG. 6, the forward or leading end of the metal mount plate B engages the outer end of the arm portion 14d (FIG. 2B) of the opener bearing 14. The pin 22 has traveled nearly to the closed forward end of the slot E in the tape access door D. The tape access door D has begun to swing open.

Figure 7:
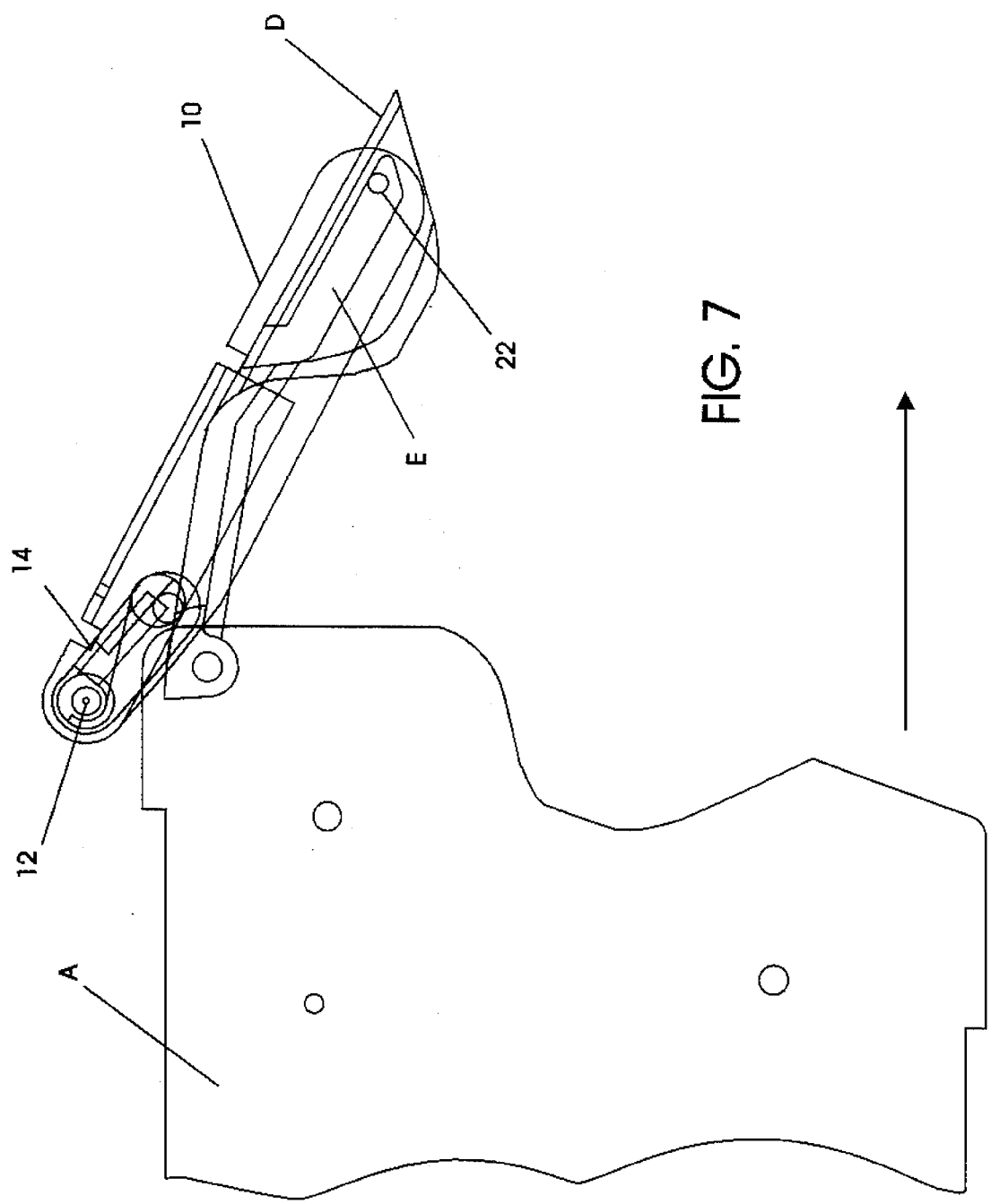

The opener bearing 14 acts as a fulcrum. As the cartridge A continues to move forwardly relative to the door opening mechanism, the leading edge of the mount plate B of the tape cartridge rotates and lifts the arm portion 14b of the opener bearing 14. The opener bearing 14 in turn rotates and lifts the door opener frame 10 via post 14c. As shown in FIG. 7, when the tape access door D has been partially opened so that it extends downwardly and forwardly at a forty-five degree angle, the opener pin 22 nearly reaches the closed forward end of the slot E in the tape access door D.

In FIG. 8, the tape cartridge A has been pushed all the way forward in the cartridge insertion slot to a point where the leading edge of its mount plate B strikes a fixed datum 28 on a stationary frame of the loader mechanism. This datum 28 prevents further forward movement of the tape cartridge A in the cartridge insertion slot. At this time, the door D of the tape cartridge is in its fully opened position. In this position, the door opener frame 10 is in its substantially horizontal extended position. The arm portion 14b of the bearing opener 14 has ridden up on top of the mount plate B of the tape cartridge A. It will be understood that the forward and top side edges of the mount plate B join in a rounded curve B' (FIG. 1) to facilitate motion of the arm portion 14d around the corner of the mount plate B when operating as a fulcrum.

The second torsion spring 26 (FIG. 2B) which is compressed between the opener bearing 14 and the door opener frame 10 pushes them apart to a certain degree. This provides compliance to variations in distance between the door opening mechanism and different tape cartridges. The compliance ensures that the tape access door D is always fully opened by the time the forward edge of the mount plate B registers with the datum 28.

When the tape cartridge A has been fully inserted to the position shown in FIG. 8, its exposed segment of magnetic tape T will have been mated into engagement with the transducer head H of the tape drive incorporating the automatic loader mechanism that utilizes our door opening mechanism. A useful feature of our door tape access door opening mechanism is that once the door D is fully open, the pin 22 is near the closed forward end of the slot E. This permits the cartridge to continue translating forward a distance until it registers with the datum 28 without the door D beginning to close. In FIG. 8, the tape cartridge A has moved forwardly a distance after the door D was fully opened until the forward edge of the mount plate D registered with the datum 28. At this time the pin 22 is near the rearward opened end of the slot E.

It will be noted that in the sequential views from FIG. 3 to FIG. 8, the tape access door D has pivoted through approximately one hundred and twenty degrees of motion. The door opener frame 10 has pivoted more than ninety degrees from its initial location, and in fact between about one hundred and twenty and one hundred and forty degrees. While we have described a preferred embodiment of our tape access door opening mechanism, it should be apparent to those skilled in the art that our invention may be modified in both arrangement and detail. For example, our tape access door opening mechanism could be adapted to open the access door of a tape cartridge other than that disclosed in the aforementioned U.S. Pat. No. 5,294,072 of Don E. East, et al. Furthermore, our tape access door opening mechanism could be utilized in conjunction with cartridge loader mechanisms other than that disclosed in the aforementioned co-pending U.S. patent application of Steven G. Hiscox, et al. Accordingly, the protection afforded our invention should only be limited in accordance with the scope of the following claims.

We claim:

1. A mechanism for opening a tape access door at the forward end of a tape cartridge which pivots about an axis perpendicular to a mount plate of the cartridge, the access door being spring biased to a closed position and including a slot which opens along a side wall of the door and has a rearward end that angles open on an outer wall of the door, the door opening mechanism comprising:

an elongate door opener frame;

a pin extending from a forward end of the door opener frame;

means for pivotally mounting a rearward end of the door opener frame to a frame of a loader mechanism adjacent a cartridge insertion slot thereof for rotation about a door opener pivot axis perpendicular to the mount plate of the cartridge so that the pin will slide into the slot in the door of the cartridge and pivot the door open as the cartridge is inserted into the cartridge insertion slot;

an opener bearing pivotable about the door opener pivot axis for engaging a forward end of the mount plate of the cartridge and the door opener frame to provide a fulcrum for pivoting the door opener frame as the cartridge is inserted into the cartridge insertion slot;

a first spring mounted for biasing the door opener frame to a retracted position; and a second spring compressed between the door opener frame and the opener bearing.

2. A tape access door opening mechanism according to claim 1 wherein the means for pivotally mounting the rear end of the door opener frame includes a pivot shaft defining the door opener pivot axis.

3. A tape access door opening mechanism according to claim 2 wherein the rearward end of the door opener frame has a pair of trunion portions each with a hole formed therein through which the pivot shaft extends.

4. A tape access door opening mechanism according to claim 1 wherein the opener bearing includes an arm portion with a post that pushes on the door opener frame.

5. A tape access door opening mechanism according to claim 1 wherein the door opener frame is made of sheet metal and the door opener bearing is made of plastic.

6. A mechanism for opening a tape access door at the forward end of a tape cartridge which pivots about an axis perpendicular to a mount plate of the cartridge, the access door being spring biased to a closed position and including a slot which opens along a side wall of the door and has a rearward end that angles open on an outer wall of the door, the door opening mechanism comprising:

an elongate door opener frame;

a pin extending from a forward end of the door opener frame; and means for pivotally mounting a rearward end of the door opener frame to a frame of a loader mechanism adjacent a cartridge insertion slot thereof for rotation about a door opener pivot axis perpendicular to the mount plate of the cartridge so that the pin will slide into the slot in the door of the cartridge and pivot the door open as the cartridge is inserted into the cartridge insertion slot, including a pivot shaft connected to the frame of the loader mechanism and about which the rearward end of the door opener frame is journaled, an opener bearing also journaled about the pivot shaft and configured to engage a forward end of the mount plate of the cartridge and the door opener frame to provide a fulcrum for pivoting the door opener frame as the cartridge is inserted into the cartridge insertion slot, and a spring compressed between the door opener frame and the opener bearing.

7. A tape access door opening mechanism according to claim 6 and further comprising a second spring for biasing the door opener frame to a retracted position.

8. A tape access door opening mechanism according to claim 6 wherein the door opener frame has an elongate arm portion connected to a body portion and a pair of trunion portions having aligned holes through which the pivot shaft extends.

9. A tape access door opening mechanism according to claim 6 wherein the opener bearing includes an arm portion with a post that pushes on the door opener frame and a pair of trunion portions having aligned holes through which the pivot shaft extends.

10. A tape access door opening mechanism according to claim 6 wherein the door opener frame pivots between an extended position which is substantially horizontal, downwardly to a retracted position through an angle of greater than ninety degrees.

11. A tape access door opening mechanism according to claim 6 wherein the door opener frame includes a flange for engaging a tab on the frame of the loader mechanism to limit the pivotal movement of the door opener frame in a first direction.

12. A tape access door opening mechanism according to claim 6 wherein the door opener frame has an elongate planar arm portion connected to a planar body portion and a pair of planar trunion portions having aligned holes through which the pivot shaft extends, the planar arm portion extending generally orthogonal to the planar body portion and a rear end of the arm portion joining with and being co-planar with one of the trunion portions.

13. A mechanism for opening a tape access door at the forward end of a tape cartridge which pivots about an axis perpendicular to a mount plate of the cartridge, the access door being spring biased to a closed position and including a slot which opens along a side wall of the door and has a rearward end that angles open on an outer wall of the door, the door opening mechanism comprising:

a door opener frame having an elongate arm portion and a pair of trunion portions having a first pair of aligned holes;

a pin extending from a forward end of the planar arm portion of the door opener frame;

an opener bearing having an elongate arm portion with a length shorter than a length of the arm portion of the door opener frame, the opener bearing having a pair of trunion portions having a second pair of aligned holes and a post portion for engaging the arm portion of the door opener frame;

a pivot shaft connected to a frame of a loader mechanism adjacent a cartridge insertion slot thereof and extending through the first and second pairs of aligned holes in the planar trunion portions of the door opener frame and the opener bearing, the pivot shaft being oriented so that the door opener frame and the opener bearing will rotate about a door opener pivot axis perpendicular to a cartridge insertion axis of the cartridge insertion slot;

a first torsion spring journaled about the pivot shaft for biasing the door opener frame to a retracted position;

a second torsion spring journaled about the pivot shaft for biasing the opener bearing to push the door opener frame toward an extended position; and the door opener frame and the door opener bearing being dimensioned and configured so that the pin will slide into the slot in the door of the cartridge as the cartridge is inserted into the cartridge insertion slot and the arm portion of the opener bearing will engage a forward end of the mount plate of the cartridge to provide a fulcrum for pivoting the door opener frame to its extended position, thereby opening the tape access door and so that the tape access door will be closed upon withdrawal of the cartridge rearwardly from the cartridge insertion slot.

* * * * *